United States Patent Office 3,435,095
Patented Mar. 25, 1969

3,435,095
THERMAL DEGRADATION OF ETHYLENE/ PROPYLENE BLOCK COPOLYMERS
Donald E. Hostetler, Pompton Plains, N.J., assignor, by mesne assignments, to Rexall Drug and Chemicals Company, Los Angeles, Calif., a corporation of Delaware
No Drawing. Filed Aug. 21, 1964, Ser. No. 391,299
Int. Cl. C08f 27/28
U.S. Cl. 260—878                                         2 Claims

ABSTRACT OF THE DISCLOSURE

A high molecular weight block copolymer having alternating homopolymer propylene and ethylene units is subjected to a thermal degradation step to obtain a treated block copolymer exhibiting superior low temperature impact resistance and superior tensile impact strength over the untreated block copolymer.

---

The present invention relates to a novel and useful composition and to a process for producing such a composition. More particularly, it relates to an improved low temperature impact resistant polypropylene composition and to a process for preparing the composition.

As heretofore known, propylene can be polymerized to a high molecular weight solid polymer by contacting propylene with a catalyst such as titanium trichloride/triethyl aluminum. Typical methods of preparing polypropylene are disclosed in Belgian Patent 538,782 and U.S. Patents 2,949,447, 2,911,384 and 2,825,721. Generally, such processes produce propylene polymers having a molecular weight of from about 50,000 to about 5,000,000 with the major proportion of the polymer being crystalline in that it exhibits a crystalline structure by X-ray analyis and is insoluble in heptane. Crystalline polypropylene is well known in the art for its highly desirable properties such as high tensile strength, high modulus of elasticity and good resistance to elevated temperatures. However, in spite of these desirable physical properties, crystalline polypropylene is known to have one particularly undesirable property in that it becomes quite brittle at low temperatures as described in U.S. Patent 3,018,263 and others. Since many of the articles molded or formed from crystalline polypropylene are to be used outside in cold weather or in other ways subjected to low temperatures, it is highly desirable that the low temperature properties of crystalline polypropylene be modified so that it will not fail when subjected to stress at the lower temperatures.

It is an object of the present invention to provide a polypropylene composition which has an improved low temperature impact resistance as compared to regular polypropylene. A further object is to provide a polypropylene composition which improves the low temperature properties while substantially maintaining the other desirable properties. Another object is to provide a process for producing a polypropylene composition having improved low temperature impact resistance. Another object is to provide a polypropylene composition which can be molded or processed in the same manner as conventional crystalline polypropylene. A still further object is to provide a process for preparing a polypropylene composition in situ. Other objects will become apparent as the description of the invention proceeds.

In summary, this invention provides an improved low temperature impact resistant crystalline polypropylene composition which is produced by subjecting an ethylene/propylene block copolymer containing about 10–60% by weight of ethylene, the balance being propylene, and an intrinsic viscosity between about 8 and about 40, a melt index of 0.0 at 230° C. and having from 2 to 8 alternating units of ethylene and propylene combined, to a temperature of at least about 230° C. with mixing until the melt index of said polymer is from about 0.2 to about 25.

As is disclosed in my copending application, U.S. Ser. No. 187,959, filed Apr. 16, 1962 a crystalline polypropylene composition having an average molecular weight of at least about 50,000 and comprising a polypropylene polymer containing in the polymer chain the grouping:

—P—DE— wherein P is a chain of the polymerized propylene monomer, and DE is a random copolymer chain of (D) the propylene monomer, and (E) a comonomer selected from the group consisting of ethylene, a $C_4$ to $C_{12}$ 1-olefin and mixtures thereof, with the copolymeric E unit being present in the composition in amounts of from about 0.2 to about 10% by weight based on the weight of the polymers in the composition, had improved low temperature impact resistant properties over monomeric crystalline polypropylene, viz showing a notched impact brittleness temperatures of −30 to −5° C., as against 10–55° C. for polypropylene (procedure of testing was ASTM D746–57T as modified in our laboratory, described below in Table I, footnote 4).

I had further found that by providing such a composition with a polypropylene polymer which is terminated on at least one end of the polymer chain by the grouping:

—F wherein F is a chain of a comonomer selected from the group consisting of ethylene, a $C_4$ to $C_{12}$ 1-olefin and mixtures thereof, with the F unit being present in the composition in amounts of from about 0.5 to about 40% by weight based on the weight of the polymers in the composition, low temperatures impact is further enhanced.

There is also disclosed in my copending case identified above an improved process of forming a crystalline polypropylene copolymer composition by the polymerization, in the presence of a catalyst, of a propylene monomer and a comonomer selected from the group consisting of ethylene, a $C_4$ to $C_{12}$ 1-olfin and mixtures thereof, to obtain a polymer composition having an average molecular weight of at least about 50,000 the improvement comprising polymerizing the propylene monomer in a reaction zone to form a polypropylene chain and then introducing the said comonomer into the zone simultaneously with said propylene monomer until the said comonomer is added in amounts of from about 0.5 to about 10% by weight based on the weight of the polymers in the composition.

To provide a still further improvement in the low temperature impact resistance of the composition, the process additionally included the step of adding a comonomer to the reaction zone in the substantial absence of propylene so as to form a polymeric chain of the comonomer on at least one end of the polypropylene chain; said comonomer being added to the ends of the chain in amounts of from about 0.5 to about 40% by weight, based on the weight of the polymers in the composition, and being selected from the group consisting of ethylene, a $C_4$ to $C_{12}$ 1-olefin and mixtures thereof.

The average molecular weight of the crystalline polymers thus produced in the composition is from about 50,000 to about 5,000,000 more preferably 100,000 to 1,000,000 and the composition is formed solely from propylene and ethylene with the ethylene being employed intermittently in amounts of from about 0.2 to about 5%. Some of the polypropylene chains of the composition are initiated or terminated, or both, with from about 2 to about 20% by weight of ethylene.

In a preferred embodiment of the present invention, the crystalline polymers are then subjected to a temperature of 230° C.–450° C. while being mixed through an extruder screw. I have found that the thus treated polymers exhibit superior low temperature impact resistance, and superior tensile impact strength to the untreated crystalline block copolymers as well as to the homopolymer crystalline polypropylene of the prior art.

The terminology "low temperature impact resistant polypropylene composition" is used in the same sense as "brittle point" which is referred to in numerous patents, such as U.S. Patent 3,018,263. It is the measure of the temperature at which the polymer exhibits brittle failure under specific impact conditions as hereinafter more fully pointed out. The expressions "a polypropylene polymer" and "polymerized propylene monomer" are employed to mean a conventional polypropylene homopolymer or copolymer. In general, such polymers contain at least about 96% propylene and up to about 4% of ethylene and/or a $C_4$ to $C_{12}$ 1-olefin comonomer constituent. Such polymers are well known in the art to have a quite high "brittle point" and thus are particularly well suited for use in the present invention. The expression "the propylene monomer" is similarly used and designates a monomer feed which will result in the formation of such "a polypropylene polymer."

The percentages by weight are based upon the propylene and comonomers used to form the crystalline polypropylene compositions. Should other polymers or materials be added to the compositions of the present invention, the weights of such added materials are excluded from weight percentage calculations.

The term "intermittently" signifies that there is a plurality of additions which both start and stop while polymerization proceeds. Thus, when intermittent addition takes place, a predetermined quantity of the comonomer is allowed to completely react with the propylene in the reaction zone, more polypropylene is allowed to form and the comonomer is again added to the polymerization zone. While the time interval may be varied considerably depending on the reaction conditions, the additions are generally spaced at intervals of at least 2 minutes to allow complete reaction of the comonomer and from about 1 to about 35 additions can quite easily be made during polymerization. Preferably, from about 4 to about 20 additions are made at intervals of from about 5 to about 30 minutes.

The phrase "in the substantial absence of propylene" is employed to mean that the propylene is vented from the system so that any propagation of the polypropylene chain is substantially avoided. The expression "to form a polymeric chain of the comonomer on at least one end of the polypropylene chain" merely signifies that the propylene polymerization reaction is either initiated or terminated, or both, by the addition of the comonomer to the reaction zone. The olefinic "($C_4$ to $C_{12}$ 1-olefin)" is used to signify an unsaturated comonomer having from about 4 to 12 carbon atoms. Such comonomers include, for example, butene-1, butene-2, 3-methyl butene-1, pentene-1, hexene-1, 1,3-butadiene, 1,8-nonadiene, 1-undecene, 1-nonene, 1,10-undecadiene, 1,11-dodecadiene, 1,3-cyclopentadiene, 1,4-cyclohexadiene, 1,5,5-cyclodecatriene and the like, as well as mixtures of such comonomers. Other equally suitable monomers are known in the art.

In carrying out the reaction, the propylene and/or the comonomer are contacted with the catalyst at any temperature within the range of about −50° F. to about 200° F. Preferably, the reaction is carried out somewhat above room temperature and a particularly preferred temperature range is from about 70° F. to about 150° F. The catalyst employed can be any of those well known in the art. For example, $3TiCl_3 \cdot AlCl_3$ or $TiCl_3$ can be used in connection with a hydrocarbon aluminum compound such as triethyl aluminum, trisobutyl aluminum, triisohexyl aluminum, trioctyl aluminum, dimethyl aluminum chloride, diethyl aluminum chloride, ethyl aluminum dichloride or methyl aluminum dibromide. Other catalysts which are well known in the art for the polypropylene reaction, can likewise be employed in the process.

The following examples are given to illustrate the invention and are not intended to limit it in any manner. In the examples all parts are expressed in parts by weight unless otherwise indicated.

The melt index of the examples is expressed in decigrams per minute as measured by ASTM-D-1238-57T employing a temperature of 230° C.

The molecular weight ranges of the polypropylene compositions of the examples are determined by the Chaing equation for the intrinsic viscosity (I.V.)—average molecular weight (M.W.) relationship for polypropylene and polyethylene: polypropylene $I.V.=1.04 \times 10^{-4}$ $M.W.^{0.80}$ and polyethylene $I.V.=6.77 \times 10^{-4}$ $M.W.^{0.67}$ (Chaing, "Journal of Polymer Science," vol. 31, p. 453, 1958). For determining the range of the average molecular weight it is first assumed that the composition is all polyethylene and the average molecular weight determined on this basis. It is next assumed that the composition is all polypropylene and the average molecular weight determined. Since the composition contained both components, it is obvious that the average molecular weight would fall within the range between the two values obtained.

EXAMPLE 1

To a 2 gallon stirred stainless steel pressure reactor is charged, under an argon atmosphere, 10 g. of $3TiCl_3 \cdot AlCl_3$ and 20 ml. of 25% (weight per volume) diethyl aluminum chloride in cyclohexane. The Al/Ti mole ratio is 2/1. The reactor is closed and pressured to 5 p.s.i.g. with hydrogen. Then propylene is introduced for 30 minutes at a constant 135 p.s.i.g. providing about 550 g. of propylene. Polymerization temperature is increased within 5–10 minutes after the start of propylene addition to 50–60° C. with external heating. 30 minutes after the end of the propylene charge, the reactor is vented to 0 to 1 p.s.i.g. over 2 minutes and cooled to 40° C. After venting, 360 g. of ethylene were introduced at a rate of 12 g. per minute. After complete addition in 30 minutes the pressure is 10 p.s.i.g. The reactor is again vented for 5 minutes. Propylene is again introduced as in the beginning. The propylene-ethylene cycle is repeated twice more, thus producing a propylene-ethylene alternating block copolymer, with the copolymer macromolecules containing six alternating units: 3 of polyethylene, and 3 of polypropylene. The starting block copolymer is represented as:

PP—PE—PP—PE—PP—PE

Ten minutes after the last ethylene addition, the polymer was purified and recovered by the following procedure: 5 liters of isopropanol were added to the reactor and the alcohol-polymer slurry stirred for ½ hour.

The slurry was then transferred to a 5 gallon stainless steel beaker and heated to boiling with stirring. The hot slurry was filtered and the filter cake reslurried for 1 hour with 5 liters of a 50–50 mixture of water and alcohol containing 10 g. of potassium carbonate. After filtering, the washing was repeated without the potassium carbonate. The washed polymer was then mixed with 250 ml. of acetone and filtered. The wet polymer was vacuum dried for 24 hours at 80° C.

A 2500 g. yield of dry powdered polymer having an average molecular weight of from about $2.2 \times 10^6$ to $2.5 \times 10^6$ is obtained with an intrinsic viscosity of about 13 and a melt index of 0 at 230° C.

The polymer was then passed through a "Sterling" one inch extruder having a length to diameter ratio of 24 to 1 and equipped with electric temperature controls covering 3 heating zones. The feed end was cooled with tap water. The temperature profile was Zone 1=260° C., Zone 2=390° C., Zone 3=260° C. and die temperature=280° C. The die produces a single strand at an extrusion rate of about 5 lbs. per hour employing a pressure of about 2700 p.s.i.g. Residence time of polymer through the extruder was 15–20 minutes, and screw speed was 40 r.p.m.

After thermal degradation the product is a mixture of PP—PE—X in which X is an polymer fragment consisting of PE and/or PE–PP combinations.

The resulting thermal treated polymer had an intrinsic viscosity of 2.9, and a melt index of 0.7 at 230° C. The physical properties of the polymer are given in Table I.

EXAMPLE 2

The same procedure and equipment in Example 1 was used, except that the copolymer macromolecules contained three alternating units (PP—PE—PP). This polymer was prepared by reacting first the 30 minutes of propylene, then venting as in Example 1, then reacting 30 minutes of ethylene, and finally reacting 30 minutes more of propylene. The reactor was then vented, and the polymer purified using the procedure of Example 1.

The recovered polymer was then treated in the one inch extruder using the reactive conditions of Example 1. The physical properties of the thermally treated polymer are given in Table I.

EXAMPLE 3

Using the same equipment and procedure described in Example 1, a copolymer containing five alternating units in the macromolecules was prepared. However, ethylene was first added to the catalyst containing reactor, for 30 minutes. Then propylene was added for 30 minutes at a constant 135 p.s.i.g. at 50–60° C. The ethylene/propylene cycle was repeated once, and then a final 30 minutes of ethylene was added to complete the polymerization. The polymer is represented as

PE—PP—PE—PP—PE

Polymer was recovered and purified as per the procedure in Example 1.

Recovered polymer was then treated in the one inch extruder; the physical properties of the thermally treated polymer are given in Table I.

EXAMPLE 4 (CONTROL)

The polymerization described in Example 1 was repeated exactly as in Example 1, except that the recovered polymer was not thermally treated in the extruder, but physical properties were determined on the intermittent block copolymer as recovered. Properties are given in Table I.

EXAMPLE 5 (CONTROL)

For comparison purposes, a commercially obtained general purpose polypropylene resin having an intrinsic viscosity of about 3.2 and an average molecular weight of about 420,000 is tested in the same manner as the polymer of Example 1. The physical properties of the polymer are given in the following table.

TABLE I

| Example No. | Intrinsic viscosity [1] | Melt index at 230° C.[2] | Percent ethylene [3] | Notched impact brittleness test temp., ° C.[4] | ASTM impact temp., ° C.[5] | Crystalline melting pt., ° C.[6] | Gurley stiffness, mg./20 mil. thickness [7] | Tensile strength at yield, p.s.i.g.[8] |
|---|---|---|---|---|---|---|---|---|
| 1 | 2.9 | 0.7 | 43 | −54 | −70 | 165 | 5,500 | 3,300 |
| 2 | 1.5 | 2.5 | 30 | −40 | −60 | 160 | 6,400 | 4,000 |
| 3 | 0.8 | 20 | 58 | −37 | −55 | 155 | 6,000 | 3,800 |
| 4 (control) | 13 | 0.0 | 43 | −21 | −9 | 160 | 5,100 | 3,300 |
| 5 (control) | 1.4 | 3.4 | 0 | +55 | +20 | 171 | 7,000 | 4,600 |

[1] 0.1% by weight solution in Decalin at 135° C.
[2] ASTM-D1238-57T.
[3] By infrared analysis.
[4] ASTM-D746-57T except that different sample bars (0.25″ wide x 1.5″ long x 0.075″ thick) are cut from sheets pressed at 400° F. The sheets are cooled in the press at 25° F. per minute. The samples are placed in the Scot Tester with the width parallel to the impact bar. A notch 0.015″ deep is cut across the thickness with a razor sharp edge.
[5] ASTM-D746-57T.
[6] Measured with a microscope under crossed nicols.
[7] Gurley Stiffness Tester procedure.
[8] ASTM designation D638-60T except that ¼″ wide x .020″ thick x 4″ length strips cut from a 6″ sheet (pressed at 400° F. and cooled at 25° F. per minute) are clamped in the Instron with a one inch jaw separation and pulled at 20″ per minute. The modulus at 1% strain is determined at a pull speed of 0.2″ minute with a 2″ jaw separation.

While in the above examples unmodified polypropylene compositions are produced, it is obvious that other materials such as dyes, pigments, fibers and other polymers may be introduced into the polypropylene compositions of the present invention without substantial alteration of the physical properties of the shaped structures formed from such compositions.

The polypropylene compositions formed in accordance with the present invention can be fabricated into useful articles in the same manner as polypropylene. For example, the compositions can be blow-molded, injection molded or extruded to form wastebaskets, bottles, tubing, films, and the like.

Many equivalent modifications will be apparent to those skilled in the art from a reading of the foregoing without a departure from the inventive concept.

I claim:
1. An ethylene/propylene copolymer containing from about 10 to about 60% by weight ethylene, said ethylene being present substantially as homopolymer blocks and having a melt index at 230° C. of from about 0.2 to about 25 as determined by ASTM D–1238–57T, a notched impact brittleness temperature below about −35° C., as determined by ASTM D746–57T as modified and described in Table I of specification footnote 4 and a crystalline melting point at least 150° C., as measured with microscope under crossed nicols.

2. The composition of matter described in claim 1 having a melt index at 230° C. of 0.5 to 5, and a notched impact brittleness temperature below about −50° C.

References Cited

UNITED STATES PATENTS 3,301,921   1/1967   Short _____ 260—878

FOREIGN PATENTS 835,038   5/1960   Great Britain.
1,258,741   3/1961   France.

MURRAY TILLMAN, *Primary Examiner.*

M. J. TULLY, *Assistant Examiner.*